Nov. 20, 1934. C. C. BAKER ET AL 1,981,023
BRAKE HEAD
Filed Dec. 11, 1933
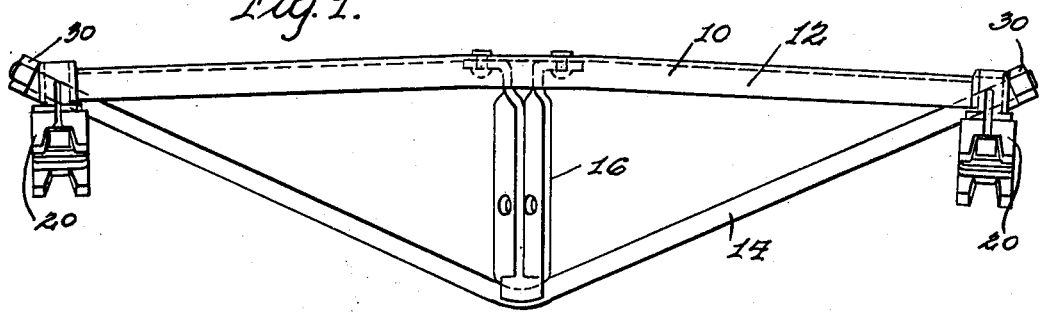
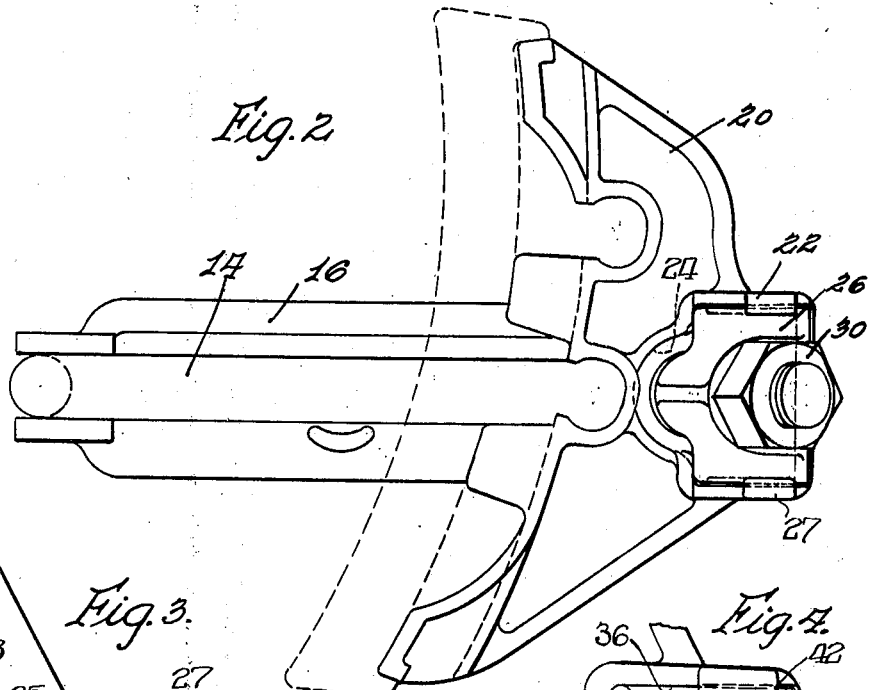
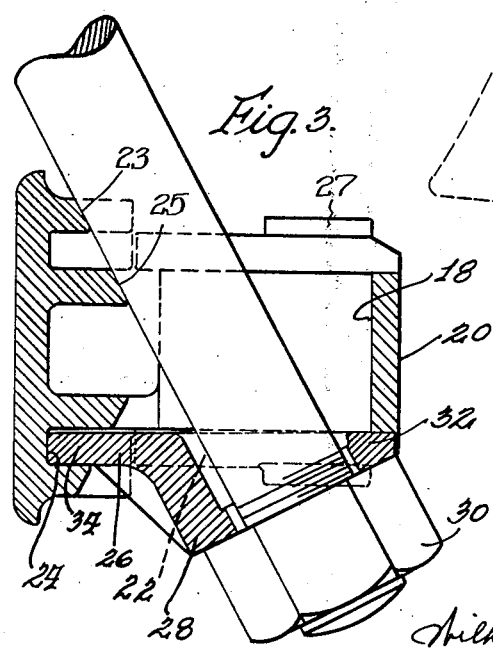
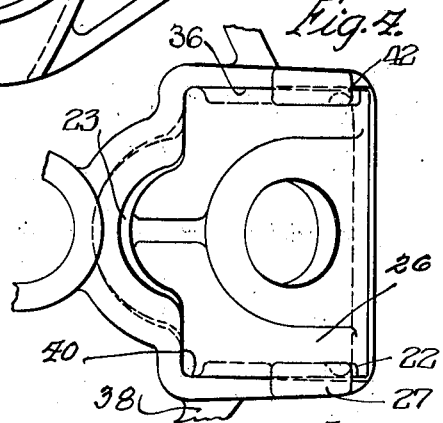
Inventors
Chris Charles Baker
Walter H. Basett Patented Nov. 20, 1934

1,981,023

UNITED STATES PATENT OFFICE 1,981,023

BRAKE HEAD

Chris C. Baker, Hammond, Ind., and Walter H. Baselt, Chicago, Ill., assignors to American Steel Foundries, Chicago, Ill., a corporation of New Jersey Application December 11, 1933, Serial No. 701,772

19 Claims. (Cl. 188—223)

This invention pertains to brake heads, and more particularly to brake heads which are reversible.

It is an object of this invention to provide a brake head construction which will require only one pattern for both right and left hand heads.

Another object is to provide a brake head which will permit of the reduction of inventory to the purchasers of the head.

A further object is to provide a brake head provided with means which will render the brake head reversible.

With these and various other objects in view, the invention may consist of certain novel features of construction and operation as will be more fully described and particularly pointed out in the specification, drawing and claims appended hereto.

In the drawing which illustrates embodiments of the device and wherein like reference characters are used to designate like parts—

Figure 1 is a top plan view of a brake beam assembly provided with brake heads embodying the invention;

Figure 2 is an enlarged side elevation of a brake head and beam assembly embodying the invention;

Figure 3 is an enlarged transverse sectional elevation of a modified form of reversible brake head, the section being taken substantially in the plane of the transverse center line of the head;

Figure 4 is an enlarged fragmentary side elevation of another modified form of the construction whereby the brake head is rendered reversible.

Referring first of all to the constructions shown in Figures 1 and 2, the brake beam assembly 10 includes the substantially channel shaped compression member 12 and the tension member 14, said members being spaced apart adjacent the center thereof by means of the brake beam fulcrum 16. The tension member 14 is threaded adjacent the ends thereof and extends through a suitable aperture 18 provided in the brake head 20.

If the brake head 20 were in one piece it would be necessary to have right and left hand heads due to the fact that the tension rod passes through the heads diagonally. To obviate this feature the head 20 is provided with the spaced guiding slots 22 terminating in the bottom slot 24, the slots being determined by the spaced bearing seats 23 and 25 of different heights to contact the tension member whereby effective contact is made over the full width of the head. A separate piece 26 forming the nut seat is adapted to be inserted into the guiding slots and positioned by the lugs 27, said nut seat including the diagonally disposed boss 28 forming the seat for the tension rod nut 30. In the construction illustrated in Figure 2, the piece 26 is a loose piece and is merely insertable into the slots without any wedging action between the head and the piece.

In the construction shown in Figure 3, the nut seat 26 is of tapering thickness, the upper portion 32 being of greater thickness than the lower portion 34 whereby the thickest portion 32, being the last to enter into the guiding slots, causes the nut 30 to wedge the piece tightly into operative position.

In the construction illustrated in Figure 4, the slot 36 which is similar to the slot 22 is formed in the brake head 38, and is of tapering width, being narrower adjacent the base 40 than at the entrance or top 42 whereby the nut seat 26, which may be similar to the so-called loose piece shown in Figure 2, is caused to be wedged into the slot by the tightening of the nut 30. It is of course to be understood that the slot 22 may be used, in which case a tapering nut seat 26 is used which will be wedged by the tightening of the nut 30.

With the constructions illustrated, by sliding this nut seat into position on either one side or the other of the main portion of the head the brake head may be adapted for either right or left hand position on a brake beam.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. A brake head having an aperture for receiving the tension member of a brake beam, said head on each side thereof being provided with spaced members which may be adapted to form tension member seats, said members forming a slot therebetween, and a seat piece selectively insertable in each slot and adapted to receive the tension member disposed through said aperture whereby said head is reversible.

2. A brake head having an aperture for receiving the tension member of a brake beam, each side of said head being provided with a slot adjacent said aperture and defined at the lower portion thereof by means which may be adapted to provide spaced tension member seats, and a seat piece selectively insertable in each slot and adapted to receive the tension member disposed through said aperture whereby said head is reversible.

3. A brake head having an aperture for receiving the tension member of a brake beam, each side of said head being provided with a slot adjacent said aperture and defined at the lower portion thereof by means which may be adapted to provide spaced tension member seats, a seat piece selectively insertable in each slot and adapted to receive the tension member disposed through said aperture whereby said head is reversible, and spaced guard lugs on each side of said head disposed to overlap said seat piece.

4. A brake head having an aperture for receiving the tension member of a brake beam, said head on each side thereof being provided with spaced members which may be adapted to form tension member seats, said members forming a slot therebetween, and a loose seat piece selectively insertable in each slot and adapted to receive the tension member disposed through said aperture whereby said head is reversible.

5. A brake head having an aperture for receiving the tension member of a brake beam, each side of said head being provided with a slot adjacent said aperture and defined at the lower portion thereof by means which may be adapted to provide spaced tension member seats, and a loose seat piece selectively insertable in each slot and adapted to receive the tension member disposed through said aperture whereby said head is reversible.

6. A brake head having an aperture for receiving the tension member of a brake beam, each side of said head being provided with a slot adjacent said aperture and defined at the lower portion thereof by means which may be adapted to provide spaced tension member seats, a loose seat piece selectively insertable in each slot and adapted to receive the tension member disposed through said aperture whereby said head is reversible, and spaced guard lugs on each side of said head disposed to overlap said seat piece.

7. A brake head having an aperture for receiving the tension member of a brake beam, each side of said head being provided with a tapering slot adjacent said aperture and defined at the lower portion thereof by means which may be adapted to provide spaced tension member seats, and a seat piece selectively insertable in each slot and adapted to receive the tension member disposed through said aperture whereby said head is reversible.

8. A brake head having an aperture for receiving the tension member of a brake beam, each side of said head being provided with a tapering slot adjacent said aperture and defined at the lower portion thereof by means which may be adapted to provide spaced tension member seats, a seat piece selectively insertable in each slot and adapted to receive the tension member disposed through said aperture whereby said head is reversible, and spaced guard lugs on each side of said head disposed to overlap said seat piece.

9. A brake head having an aperture for receiving the tension member of a brake beam, said head on each side thereof being provided with spaced members which may be adapted to form tension member seats, said members forming a slot therebetween, and a tapering seat piece selectively insertable in each slot and adapted to receive the tension member disposed through said aperture whereby said head is reversible.

10. A brake head having an aperture for receiving the tension member of a brake beam, each side of said head being provided with a slot adjacent said aperture and defined at the lower portion thereof by means which may be adapted to provide spaced tension member seats, and a tapering seat piece selectively insertable in each slot and adapted to receive the tension member disposed through said aperture whereby said head is reversible.

11. A brake head having an aperture for receiving the tension member of a brake beam, each side of said head being provided with a slot adjacent said aperture and defined at the lower portion thereof by means which may be adapted to provide spaced tension member seats, a tapering seat piece selectively insertable in each slot and adapted to receive the tension member disposed through said aperture whereby said head is reversible, and spaced guard lugs on each side of said head disposed to overlap said seat piece.

12. A brake head having an aperture for receiving the tension member of a brake beam, said head on each side thereof being provided with spaced members which may be adapted to form tension member seats, said members forming a slot therebetween, and a seat piece of tapering thickness selectively insertable in each slot and adapted to receive the tension member disposed through said aperture whereby said head is reversible.

13. A brake head having an aperture for receiving the tension member of a brake beam, each side of said head being provided with a slot adjacent said aperture and defined at the lower portion thereof by means which may be adapted to provide spaced tension member seats, and a seat piece of tapering thickness selectively insertable in each slot and adapted to receive the tension member disposed through said aperture whereby said head is reversible.

14. A brake head having an aperture for receiving the tension member of a brake beam, each side of said head being provided with a slot adjacent said aperture and defined at the lower portion thereof by means which may be adapted to provide spaced tension member seats, a seat piece of tapering thickness selectively insertable in each slot and adapted to receive the tension member disposed through said aperture whereby said head is reversible, and spaced guard lugs on each side of said head disposed to overlap said seat piece.

15. A brake head having an aperture for receiving the tension member of a brake beam, each side of said head being provided with a slot adjacent said aperture and defined at the lower portion thereof by means which may be adapted to provide spaced tension member seats, said slots being narrower adjacent said tension member seats, and a seat piece selectively insertable in each slot and adapted to receive the tension member disposed through said aperture whereby said head is reversible.

16. A brake head having an aperture for receiving the tension member of a brake beam, each side of said head being provided with a slot adjacent said aperture and defined at the lower portion thereof by means which may be adapted to provide spaced tension member seats, said slots being narrower adjacent said tension member seats, a seat piece selectively insertable in each slot and adapted to receive the tension member disposed through said aperture whereby said head is reversible, and spaced guard lugs on each side of said head disposed to overlap said seat piece.

17. A brake head having an aperture for receiving the tension member of a brake beam, each side of said head being provided with a slot adjacent said aperture and defined at the lower portion thereof by means which may be adapted to provide spaced tension member seats, said slots being narrower adjacent said tension member seats, and a loose seat piece selectively insertable in each slot and adapted to receive the tension member disposed through said aperture whereby said head is reversible.

18. A brake head having an aperture for receiving the tension member of a brake beam, each side of said head being provided with a slot adjacent said aperture and defined at the lower portion thereof by means which may be adapted to provide spaced tension member seats, said slots being narrower adjacent said tension member seats, a loose seat piece selectively insertable in each slot and adapted to receive the tension member disposed through said aperture whereby said head is reversible, and spaced guard lugs on each side of said head disposed to overlap said seat piece.

19. A brake head having an aperture for receiving the tension member of a brake beam, each side of said head being provided with a slot adjacent said aperture and defined at the lower portion thereof by means which may be adapted to provide spaced tension member seats, said slots being narrower adjacent said tension member seats, and a tapering seat piece selectively insertable in each slot and adapted to receive the tension member disposed through said aperture whereby said head is reversible.

CHRIS C. BAKER.
WALTER H. BASELT.